United States Patent
Talyansky et al.

(10) Patent No.: US 10,346,468 B2
(45) Date of Patent: Jul. 9, 2019

(54) OPTICALLY VERIFIED SAMPLE AUTHENTICATION

(71) Applicants: Vitaly Talyansky, Portland, OR (US); Edward Talyansky, Battle Ground, WA (US); Jose Gasque, Vancouver, WA (US)

(72) Inventors: Vitaly Talyansky, Portland, OR (US); Edward Talyansky, Battle Ground, WA (US); Jose Gasque, Vancouver, WA (US)

( * ) Notice: Subject to any disclaimer, the term of this patent is extended or adjusted under 35 U.S.C. 154(b) by 282 days.

(21) Appl. No.: 15/444,842

(22) Filed: Feb. 28, 2017

(65) Prior Publication Data

US 2018/0247151 A1 Aug. 30, 2018

(51) Int. Cl.
| | |
|---|---|
| G06K 9/46 | (2006.01) |
| G06F 16/58 | (2019.01) |
| G06F 16/583 | (2019.01) |
| G06K 9/00 | (2006.01) |
| G06K 9/20 | (2006.01) |

(52) U.S. Cl.
CPC ...... *G06F 16/5866* (2019.01); *G06F 16/5838* (2019.01); *G06K 9/00577* (2013.01); *G06K 9/2036* (2013.01); *G06K 2209/27* (2013.01)

(58) Field of Classification Search
CPC ........... G06F 16/5866; G06F 16/5838; G06K 9/00577; G06K 9/2036
See application file for complete search history.

(56) References Cited

U.S. PATENT DOCUMENTS

| | | | | |
|---|---|---|---|---|
| 10,129,234 | B2* | 11/2018 | Uetabira | H04W 4/029 |
| 2014/0326784 | A1* | 11/2014 | Naik | G06Q 10/08 |
| | | | | 235/375 |
| 2016/0034913 | A1* | 2/2016 | Zavarehi | G06Q 30/0185 |
| | | | | 235/462.25 |
| 2017/0032382 | A1* | 2/2017 | Shulman | G06Q 30/06 |
| 2017/0227995 | A1* | 8/2017 | Lee | G06F 1/1694 |
| 2018/0235468 | A1* | 8/2018 | Khachaturian | A61B 5/02427 |
| 2018/0247151 | A1* | 8/2018 | Talyansky | G06K 9/00577 |
| 2018/0249070 | A1* | 8/2018 | Lau | H04N 5/23222 |

* cited by examiner

*Primary Examiner* — Gregory M Desire (57) ABSTRACT

System and method for optically verified sample authentication are described herein. An example system includes a detection device to authenticate a sample and to return a positive authentication result if the sample is authentic and return a negative authentication result if the sample is not authentic, the detection device containing an optical emitter to emit a series of pulses of light in a first sequential pattern, a smartphone in close proximity to and facing the detection device and the sample, the smartphone containing a camera to detect the first sequential pattern of light, and a database to store data from the smartphone, wherein the optical emitter emits the first sequential pattern of light before the detection device authenticates the sample, the smartphone captures a first image of the detection device after the smartphone detects the first sequential pattern of light emitted by the optical emitter, and the smartphone transmits first data to the database after the detection device authenticates the sample.

20 Claims, 6 Drawing Sheets

DATABASE TABLE
500

| Device ID | GPS location | Timestamp | Image File | Authentication Result |
|---|---|---|---|---|
| 372 | Loc1 | Time1 | Img1 | Authentic |
| 372 | Loc1 | Time2 | Img2 | Authentic |
| 372 | Loc2 | Time3 | Img3 | Not Authentic |
| 491 | Loc1 | Time4 | Img4 | Authentic |
| 491 | Loc2 | Time5 | Img5 | Authentic |
| 564 | Loc3 | Time6 | Img6 | Not Authentic |
| 564 | Loc3 | Time7 | Img7 | Authentic |

DATABASE TABLE 500

| Device ID 502 | GPS location 504 | Timestamp 506 | Image File 508 | Authentication Result 510 |
|---|---|---|---|---|
| 372 | Loc1 | Time1 | Img1 | Authentic |
| 372 | Loc1 | Time2 | Img2 | Authentic |
| 372 | Loc2 | Time3 | Img3 | Not Authentic |
| 491 | Loc1 | Time4 | Img4 | Authentic |
| 491 | Loc2 | Time5 | Img5 | Authentic |
| 564 | Loc3 | Time6 | Img6 | Not Authentic |
| 564 | Loc3 | Time7 | Img7 | Authentic |

FIG. 6

OPTICALLY VERIFIED SAMPLE AUTHENTICATION

FIELD OF THE DISCLOSURE

The present disclosure relates generally to product authentication and, more particularly, to optically verified sample authentication.

BACKGROUND

There are many applications in which detecting or authenticating an item is useful. It may also be desirous for a third party to later verify the item that was detected or authenticated.

DETAILED DESCRIPTION

Many applications require the authentication, detection, scanning, or electrical interrogation of an item or some feature of an item. Such an application may involve scanning a product for inventory control, detecting the presence of or a particular property of a sample, or authenticating that an item is not counterfeit, among other things. The present invention involves products or labels on products that are embedded with taggant, which is a ceramic nanoparticle that has particular luminescent properties, to mark the product as authentic. A counterfeit of the object would not contain taggant, and as such, an authentic item could be distinguished from a counterfeit item by detecting whether or not taggant was present in the item.

In the present invention, the taggant used to mark an item has luminescent properties such that when the taggant is illuminated by light at a particular wavelength (the taggant's excitation wavelength), it emits light at another wavelength (the taggant's emission wavelength). Therefore, taggant in an item can be detected by a device that illuminates the item with light at the taggant's excitation wavelength and detects light at the taggant's emission wavelength in order to authenticate the item. The results of the authentication can then be stored in a remote database that can be later accessed by a third party to verify that an item was authenticated. The information stored in the database might also include additional data such as the location of the authentication and the time of the authentication. This can allow a supervisor or other individual to track items along a supply chain, perform forensic analysis of when a counterfeit item was introduced into a supply chain, or perform other types of analysis.

While the information in such a database can be quite useful for analysis, it can be difficult if not impossible for someone reviewing the data to ensure that the item that was allegedly authenticated according to the database records was actually the item listed in the database record. The database may show that a particular item was authenticated at a particular time and place but it is possible that the individual who allegedly authenticated the item actually detected a different item than what was placed into the supply chain either through error or as a nefarious act. This problem can be partially alleviated by having the person performing the authentication take a picture of the item as it is being scanned and including the image in the database log. However, even this could be defeated either by user error or by a nefarious individual who takes a picture of one item allegedly being authenticated while actually authenticating a different item, negating the value of the database information. This problem is solved by the present invention using optically verified sample authentication.

Example methods, apparatus and/or articles of manufacture disclosed herein provide optical verification of a detector and a sample being authenticated by the detector. In examples disclosed herein, a detector and a nearby smartphone establish a Bluetooth connection before an item is authenticated. In examples disclosed herein, the detector authenticates an adjacent sample while simultaneously or near simultaneously emitting light in a specific sequential pattern that impinges on the face of the smartphone. In examples disclosed herein, when this light pattern is detected by the smartphone, the smartphone captures an image of the detector and the sample being authenticated. In examples disclosed herein, the smartphone then uploads this image to a remote database along with the information about the authentication received from the detector via the Bluetooth connection. This ensures that the image captured by the smartphone is actually an image of the detector authenticating the sample shown in the image.

Figure 1:
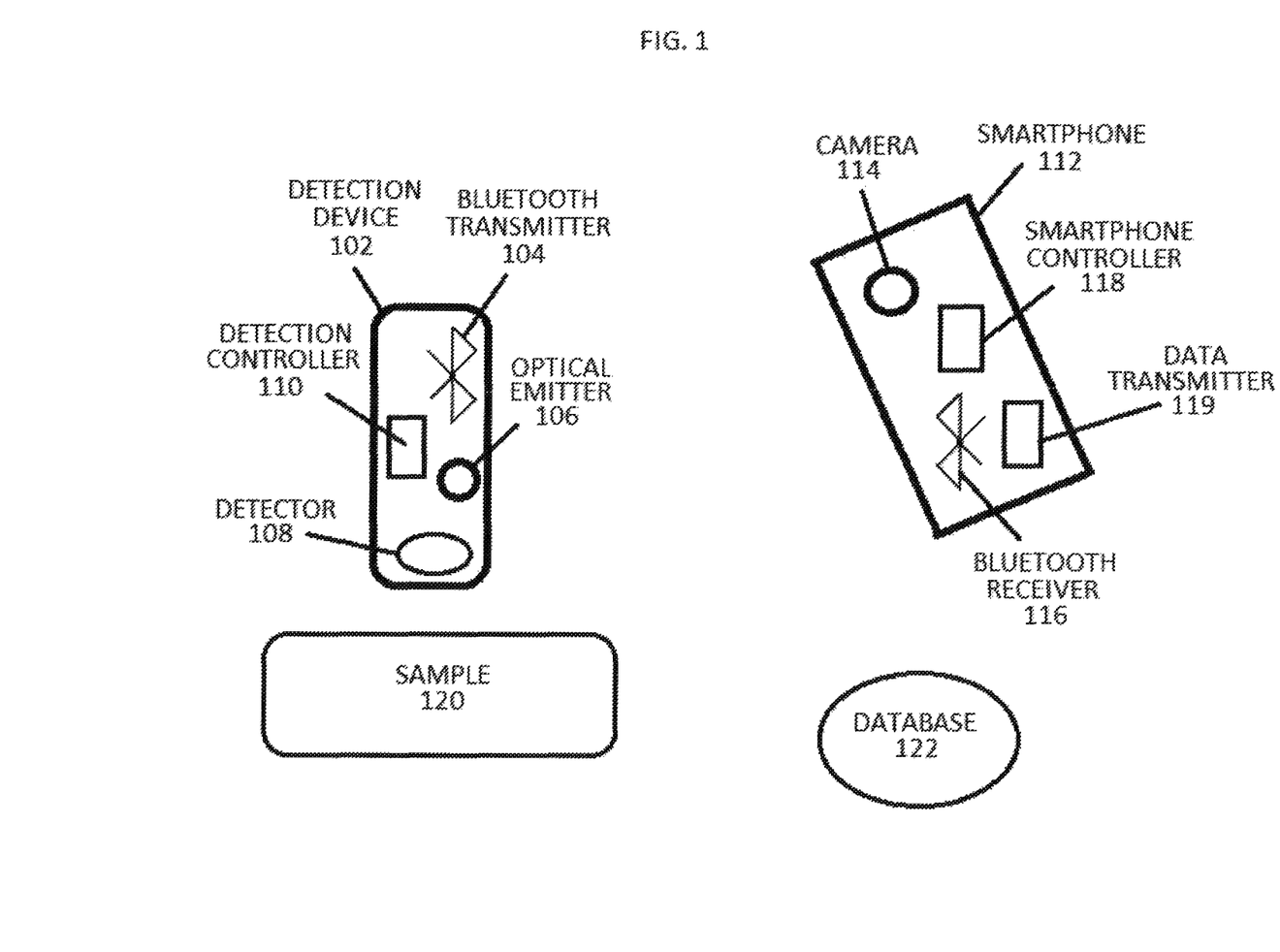
FIG. 1 is a block diagram of a system for optical verification of sample authentication in accordance with the teachings of this disclosure.

FIG. 1 is a block diagram of an example optical verification system in accordance with the teachings of this disclosure. The system of FIG. 1 includes a detection device 102, a smartphone 112, a sample 120 and a database 122. The example detection device 102 of FIG. 1 includes a Bluetooth transmitter 104, an optical emitter 106, a detector 108, and a detection controller 110. The example smartphone 112 includes a camera 114, a Bluetooth receiver 116, a smartphone controller 118 and a data transmitter 119.

The example Bluetooth transmitter 104 of FIG. 1 is a standard Bluetooth device that uses the Bluetooth protocol to pair with and communicate with the example smartphone 112 via the example Bluetooth receiver 116. This Bluetooth communication between the example detection device 102 and the example smartphone 112 allows them to coordinate their operations and transmit data to each other. In other examples, the detection device 102 and the smartphone 112 communicate through a wired connection or through a different wireless protocol than Bluetooth.

The example optical emitter 106 emits light in a particular sequential pattern to trigger the smartphone 112 to take certain operations. In the illustrated example, the optical emitter 106 emits red light. In other examples, the optical emitter 106 may emit light of any color. In the illustrated example, the optical emitter 106 emits light in a particular sequential pattern at high speeds. For example the optical emitter 106 may emit light for a duration of t1 microseconds, then turn off for a duration of t2 microseconds, then emit light for a duration of t3 microseconds, then turn off for a duration of t4 microseconds, then emit light for a duration of t5 microseconds. The sequential pattern may contain any number of pulses that turn on for any number of different durations. The pattern of light emitted by the example optical emitter 106 is either known by or transmitted to the example smartphone 112 in advance of the optical emitter 106 emitting its pattern of light such that the smartphone 112 can detect when the proper pattern has been emitted by the optical emitter 106.

In the illustrated example, the detector 108 authenticates that the sample 120 is authentic and not counterfeit. In other examples, the detector 108 may perform other operations involving the detection, scanning or electrical interrogation of the sample 120. The detector 108 of the illustrated example is discussed further in connection with FIG. 2.

The example detection controller 110 of FIG. 1 controls the operation of the example detection device 102. Specifically, the example detection controller 110 controls the operation of the example Bluetooth transmitter 104, the example optical emitter 106, and the example detector 108.

In the illustrated example, the smartphone 112 is a commercially available smartphone. The example smartphone 112 may be an Apple iPhone, an Android phone, a Microsoft phone or any other commercially available smartphone. In some examples, the smartphone 112 may be a custom phone designed specifically for this invention or for other purposes.

In the illustrated example, the camera 114 is the standard camera hardware that comes with most commercially available smartphones. The example camera 114 captures images that are within a line of sight of the camera 114 and its associated camera lens.

In the illustrated example, the Bluetooth receiver 116 is the standard Bluetooth hardware that comes with most commercially available smartphones. The example Bluetooth receiver 116 allows the smartphone 112 to pair with, communicate with and send and receive data from the example detection device 102.

The example smartphone controller 118 controls the operation of the example smartphone 112. Specifically, the example smartphone controller 118 controls the operation of the example camera 114, the example Bluetooth receiver 116, the example smartphone controller 118 and the example data transmitter 119.

The example data transmitter 119 of FIG. 1 transmits data to the example database 122. In the illustrated example, the data transmitter 119 uses standard hardware available on most commercially available smartphones to transmit data to the example database 122 via Wi-Fi or other means of wireless communication. In some examples, the data transmitter 119 may communicate with the database 122 via a wired or other type of connection.

In the illustrated example, the sample 120 is an item to be authenticated. In other examples, the sample 120 may be an item to be scanned, detected or electrically interrogated for any purpose. In the illustrated example, the sample 120 contains embedded nanoparticles called taggant. This embedded taggant is made of inorganic, ceramic particles having a mean particle diameter of less than one micron. The taggant embedded in the example sample 120 has luminescent properties such that when it is illuminated by light having a characteristic wavelength (the excitation wavelength of the taggant), it emits light having another characteristic wavelength (the emission wavelength of the taggant). In the illustrated example, the excitation wavelength of the taggant is less than the emission wavelength of the taggant. In other examples, the excitation wavelength of the taggant may be equal to or greater than the emission wavelength of the taggant. In the illustrated example, the excitation wavelength and the emission wavelength of the taggant are both in the infrared portion of the electromagnetic spectrum. In other examples, the excitation and emission wavelengths of the taggant may be in any portion of the electromagnetic spectrum.

The example database 122 receives data from the smartphone 112 and stores this received data. The example database 122 can be accessed by individuals with appropriate access privileges in order to view the data stored thereon. In the illustrated example, the database 122 is a remote database accessed through cloud storage. In other examples, the database 122 may be a physical database in any location. In the illustrated example, the database 122 is a SQL database. In other examples, the database 122 may be any type of database. The example database 122 is discussed further in connection with FIG. 5.

Figure 2:
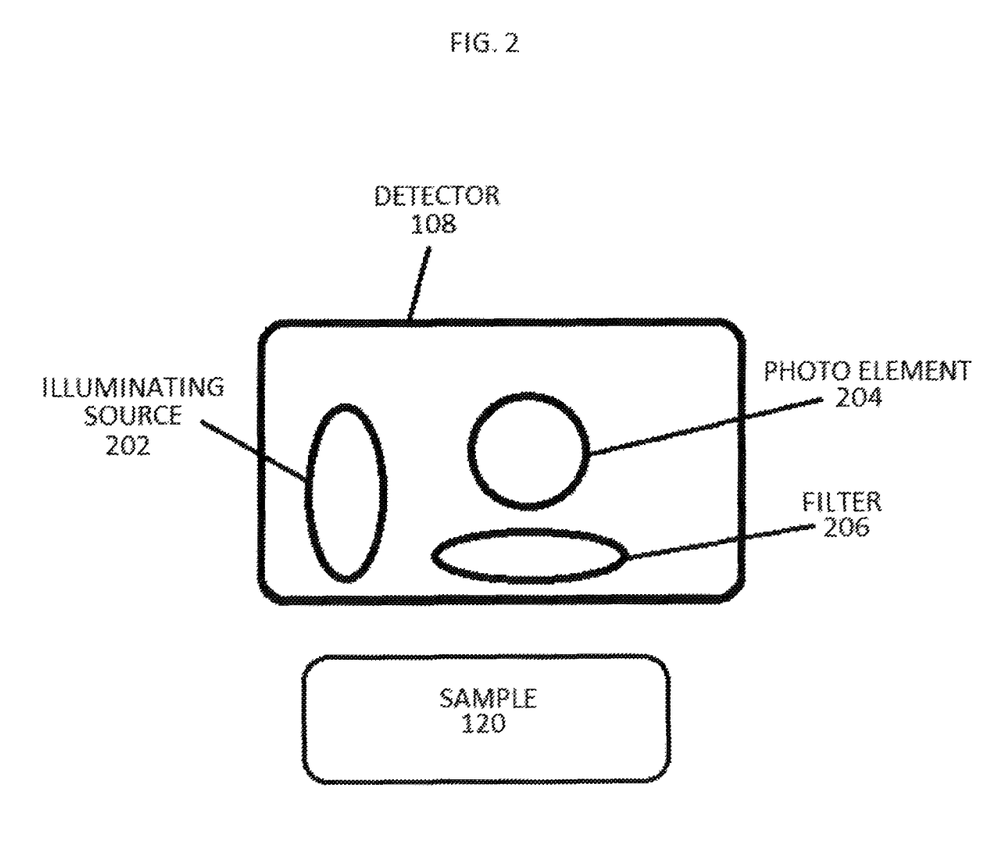
FIG. 2 is a block diagram of the detector element of FIG. 1 in accordance with the teachings of this disclosure.

FIG. 2 is a block diagram of the detector 108 in accordance with the teachings of this disclosure. The example detector 108 of FIG. 2 includes an illuminating source 202, a photo element 204 and a filter 206.

The example illuminating source 202 of FIG. 2 emits light at the excitation wavelength of the taggant embedded in the example sample 120. In the illustrated example, the illuminating source 202 is a light emitting diode. In other examples, the illuminating source 202 may be a laser diode or any other device capable of emitting light at the excitation wavelength of the taggant embedded in the sample 120.

The example photo element 204 of FIG. 2 detects light at the emission wavelength of the taggant embedded in the example sample 120. This allows the example detector 108 to detect the luminescent emission of the example sample 120. In the illustrated example, the photo element 204 is a photodiode. In other examples, the photo element 204 may be any other device capable of detecting light at the emission wavelength of the taggant embedded in the sample 120.

The example filter 206 of FIG. 2 is an optical filter that passes light at the emission wavelength of the taggant embedded in the example sample 120 and blocks light at most other wavelengths. This allows the luminescent emission from the example sample 120 to impinge on the example photo element 204 but blocks light from the example illuminating source 202 or other ambient sources of light that would interfere with the photo element 204. In the illustrated example, the filter 206 is a band-pass filter centered on the emission wavelength of the taggant in the sample 120. In other examples, the filter 206 may be a low-pass filter, a high-pass filter or any other type of optical filter that passes light at the emission wavelength of the taggant in the sample 120 and blocks light at most other wavelengths. In some examples, the detector 108 does not contain a filter 206.

While an example manner of implementing the optically verified sample authentication has been illustrated in FIG. 1, one or more of the elements, processes and/or devices illustrated in FIG. 1 may be combined, divided, re-arranged, omitted, eliminated and/or implemented in any other way. Further, the example Bluetooth transmitter 104, the example optical emitter 106, the example detector 108, the example detection controller 110 and/or, more generally, the example detection device 102 of FIG. 1 may be implemented by hardware, software, firmware and/or any combination of hardware, software and/or firmware. Thus, for example, any of the example Bluetooth transmitter 104, the example optical emitter 106, the example detector 108, the example detection controller 110 and/or, more generally, the example detection device 102 of FIG. 1 could be implemented by one or more circuit(s), programmable processor(s), application specific integrated circuit(s) (ASIC(s)), programmable logic device(s) (PLD(s)), microprocessor(s), hardware processor(s), and/or field programmable logic device(s) (FPLD(s)), etc. When any of the system or apparatus claims of this patent are read to cover a purely software and/or firmware implementation, at least one of the example Bluetooth transmitter 104, the example optical emitter 106, the example detector 108, the example detection controller 110 and/or, more generally, the example detection device 102 of FIG. 1 is hereby expressly defined to include a tangible computer readable storage medium such as a memory, DVD, CD, Blu-ray, etc. storing the software and/or firmware. Further still, the example Bluetooth transmitter 104, the example optical emitter 106, the example detector 108, the example detection controller 110 and/or, more generally, the example detection device 102 of FIG. 1 may include more than one of any or all of the illustrated elements, processes and devices.

Figure 3:
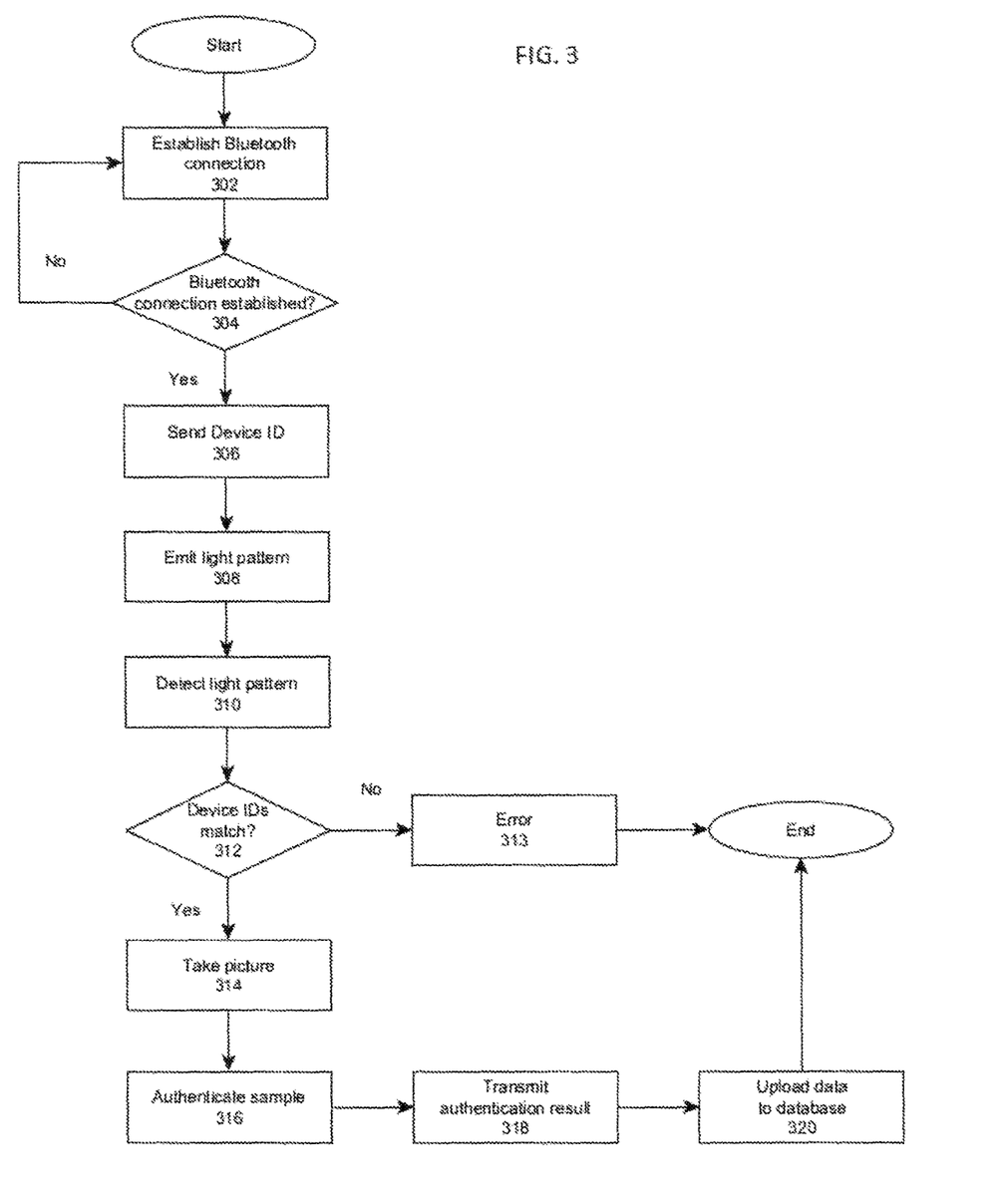
FIG. 3 is a flowchart representative of example machine readable instructions that may be executed to implement the example system for optical verification of sample authentication of FIG. 1

FIG. 3 is a flowchart representative of example machine readable instructions for implementing the example optical verification system of FIG. 1. In the example flowchart of FIG. 3, the machine readable instructions comprise program(s) for execution by a processor such as the processor 612 shown in the example computer 600 discussed below in connection with FIG. 6. The program(s) may be embodied in software stored on a tangible computer readable storage medium such as a CD-ROM, a floppy disk, a flash drive, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program(s) is described with reference to the flowchart illustrated in FIG. 3, many other methods of implementing the example optical verification system of FIG. 1 may alternatively be used. For example, the order of execution of the blocks may be changed, and/or some of the blocks described may be changed, eliminated, or combined.

As mentioned above, the example processes of FIG. 3 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage device and/or disk and to exclude propagating signals. Additionally or alternatively, the example processes of FIG. 3 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage device and/or disk and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

In the illustrated example of FIG. 3, an app is running on the example smartphone 112 that is programmed to handle the operations described in FIG. 3. In other examples, the operations may be hardware controlled or controlled in any other manner. The example of FIG. 3 requires the example smartphone 112 to be held in close proximity to the example detection device 102 with the face of the smartphone 112 facing the detection device 102 while the detection device 102 is in position to detect the sample 120. The example optical emitter 106 must be in the line of sight of the lens of the example camera 114. Preferably, the camera 114 has a view of the entire detection device 102 and the sample 120. This allows for the most accurate image to be captured during operation.

FIG. 3 begins when the example detection device 102 and the example smartphone 112 establish a Bluetooth connection with each other (block 302). The Bluetooth connection is established via the example Bluetooth transmitter 104 and the example Bluetooth receiver 116 by pairing the example detection device 102 and the example smartphone 112 using the standard Bluetooth protocol. The example detection controller 110 and the example smartphone controller 118 then check whether a Bluetooth connection was properly established (block 304). If a Bluetooth connection was not properly established, control returns to block 302 and another attempt at establishing a Bluetooth connection is made. If a Bluetooth connection was established, control passes to block 306.

After it is confirmed that a Bluetooth connection was established between the example detection device 102 and the example smartphone 112 (block 304), the example detection controller 110 transmits the device ID of the detection device 102 to the example smartphone 112 via the Bluetooth connection (block 306). The device ID transmitted is an identification number that uniquely identifies the particular detection device 102 being used. After it is received by the example smartphone 112, the device ID is stored by the example smartphone controller 118.

Figure 4:
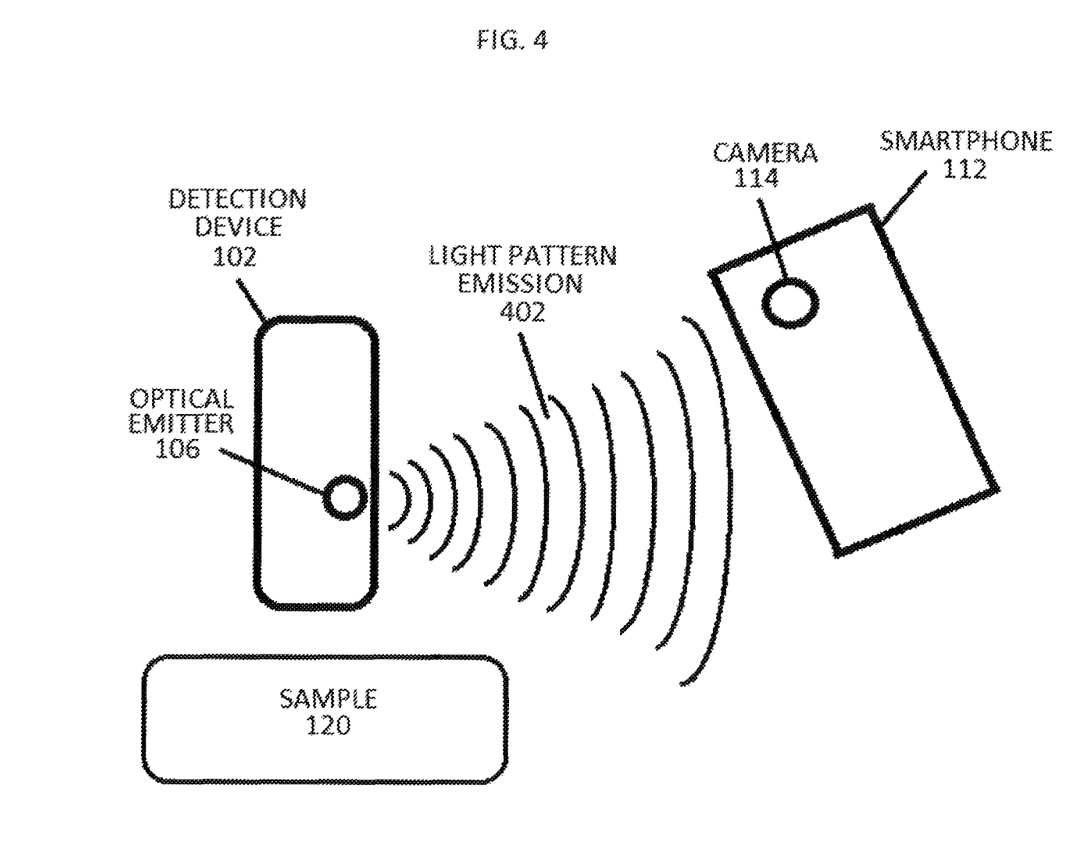
FIG. 4 is a block diagram and illustration of the system for optical verification of sample authentication while in operation in accordance with the teachings of this disclosure.

After the device ID of the example detection device 102 is transmitted to the example smartphone 112 (block 306), the example optical emitter 106 emits a light pattern that impinges on the face of the example smartphone 112 and the lens of the example camera 114 as shown in FIG. 4 (block 308). In the illustrated example, the optical emitter 106 emits a series of pulses of light in a particular sequential pattern that corresponds to the device ID. In the illustrated example, the series of pulses are emitted by the optical emitter 106 at a high speed such that the pattern cannot be detected by the naked eye. The series of pulses of light emitted by the example optical emitter 106 are detectable by the example smartphone 112.

After the example optical emitter 106 emits the light pattern (block 308), the example smartphone 112 detects the emitted light pattern using the example camera 114 (block 310). This is accomplished by the example camera 114 constantly processing the image in its field of view and looking for a series of pulses. After the example smartphone 112 detects the light pattern emitted by the example optical emitter 106, the example smartphone controller 118 decodes the pattern to discern the device ID encoded into the received light pattern and compares it to the device ID previously received via the Bluetooth connection (block 312). If the two device IDs do not match then control passes to block 313. If the two device IDs match then control passes to block 314.

If the example smartphone controller 118 determines that the device ID received via the Bluetooth connection does not match the device ID encoded in the received light pattern (block 312), then the smartphone controller 118 indicates that an error has occurred to the user of the smartphone 112 (block 313). This verification of the device ID prevents nefarious users from fooling the system by using multiple detection devices or otherwise attempting to defeat the security of the verification system. After the smartphone controller 112 indicates that an error has occurred (block 313), the example of FIG. 3 ends.

If the example smartphone controller 118 determines that the device ID received via the Bluetooth connection matches the device ID encoded in the received light pattern (block 312), then the example camera 114 snaps a picture (block 314). As long as the example smartphone 112 remains pointed at the example detection device 102 and the example sample 120, the picture snapped will capture an image of the detection device 102 authenticating the sample 120. The captured image is then stored by the smartphone controller 118.

Shortly after or simultaneous with the example 114 snapping a picture (block 314), the example detector 108 authenticates the example sample 120 (block 316). In the illustrated example, the detector 108 authenticates the sample 120 by the detection controller 110 causing the illuminating source 202 to emit light at the excitation wavelength of the taggant in the sample 120 followed by the photo element 204 detecting the luminescent response emitted by the sample 120. In the illustrated example, if the luminescent response detected by the example photo element 204 is above a threshold value, the authentication is positive. In the illustrated example, if the luminescent response detected by the example photo element 204 is not above a threshold value, the authentication is negative. In other examples, other methods of authenticating the sample may be used. In some examples, other types of detection or scanning of the sample 120 may be performed other than authentication.

After the example detector 108 authenticates the example sample 120 (block 316), the example detection controller 110 transmits the results of the detection to the example smartphone 112 via the Bluetooth connection 318 (block 318). After the example smartphone 112 receives the results of the authentication via the Bluetooth connection, the example smartphone controller 118 transmits the results of the authentication, the picture taken by the example camera 114 and various other data to the example database 122 (block 320). An example of the data transmitted to the example database 122 is discussed in connection with FIG. 5. After all of this data is transmitted to the example database 122, the example of FIG. 3 ends.

Figure 5:
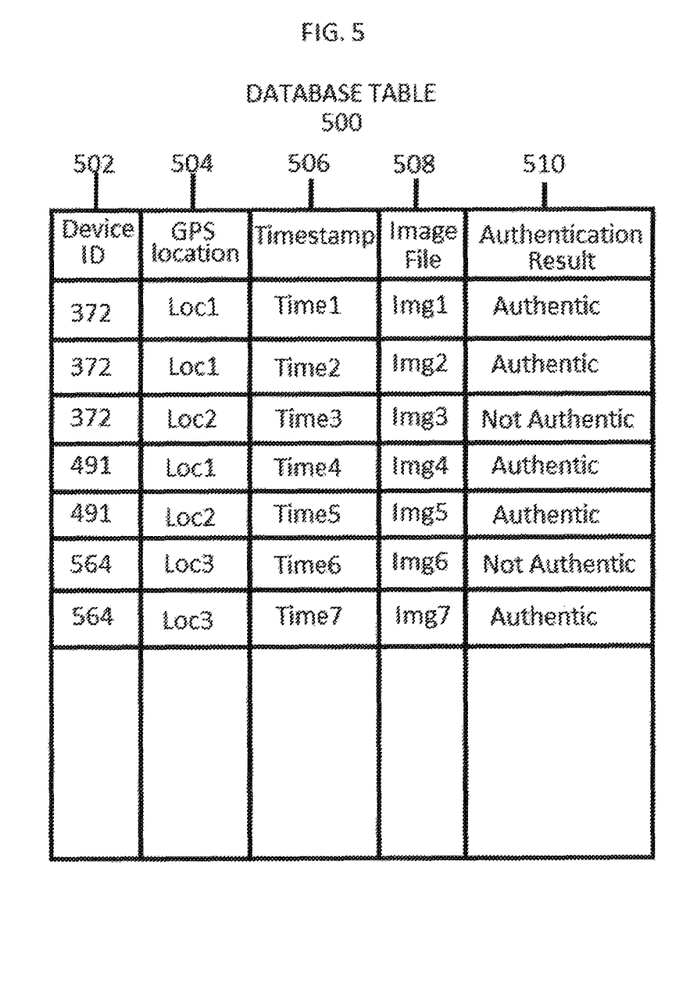
FIG. 5 is an illustration of an example table of the database of FIG. 1.

FIG. 5 illustrates an example database table 500 that may be created when data is uploaded from the example smartphone 112 to the example database 122. The database table 500 of FIG. 5 is one example of a table that may be stored in the example database 122. In the illustrated example of FIG. 5, the database table 500 contains a Device ID column 502, a GPS location column 504, a Timestamp column 506, an Image File column 508 and an Authentication Result column 510. In the illustrated example, every time the smartphone 112 uploads data to the database 122, a new row in the database table 500 is created.

In the illustrated example of FIG. 5, the Device ID column 502 contains the ID of the detection device 102 used for a particular authentication. The ID of the example detection device 102 being used is transmitted to the example smartphone 112 via the Bluetooth connection between the detection device 102 and the smartphone 112 and also via the light pattern emitted by the example optical emitter 106. In the illustrated example of FIG. 5, the Device ID is a 3-digit number but in other examples the Device ID may be in any format.

In the illustrated example of FIG. 5, the GPS location column 504 contains the location of the example smartphone 112 when an authentication is made. This column ensures that the example database table 500 contains a record of where every authentication was made and is useful for tracking products along a supply chain and for other purposes. In the illustrated example, the location is determined via the standard GPS receiver of the example smartphone 112. In the illustrated example of FIG. 5, the locations in the database table 500 are represented by strings but may be represented by any data format.

In the illustrated example of FIG. 5, the Timestamp column 506 contains the date and time that an authentication was made. This column ensures that the database table 500 contains a record of when every authentication was made and is useful for tracking a product as it moves through a supply chain over time. In some examples, the date and the time of a particular authentication are stored in separate columns. In the illustrated example of FIG. 5, the timestamps are represented by strings but may be represented by any data format.

In the illustrated example of FIG. 5, the Image File column 508 contains a link to the file of the image that was snapped by the camera 114 as the sample 120 was being authenticated by the detection device 102. This allows someone reviewing the database to see an image of the detection device 102 and the sample 120 as the detection device 102 was authenticating the sample 120. In the illustrated example of FIG. 5, the Image File contains a string representing the name and file location of the image file. In other examples, the Image File column 508 may contain a representation of the image or a link or reference to the image in any particular format.

In the illustrated example of FIG. 5, the Authentication Result column 510 contains the result of an authentication. Specifically, the Authentic Result column 510 contains a record of whether the example detection device 102 determined that the example sample 120 was authentic or not authentic. In other examples, the Authentic Result column 510 may contain other data related to the scanning, detection, or electrical interrogation of the sample 120.

Figure 6:
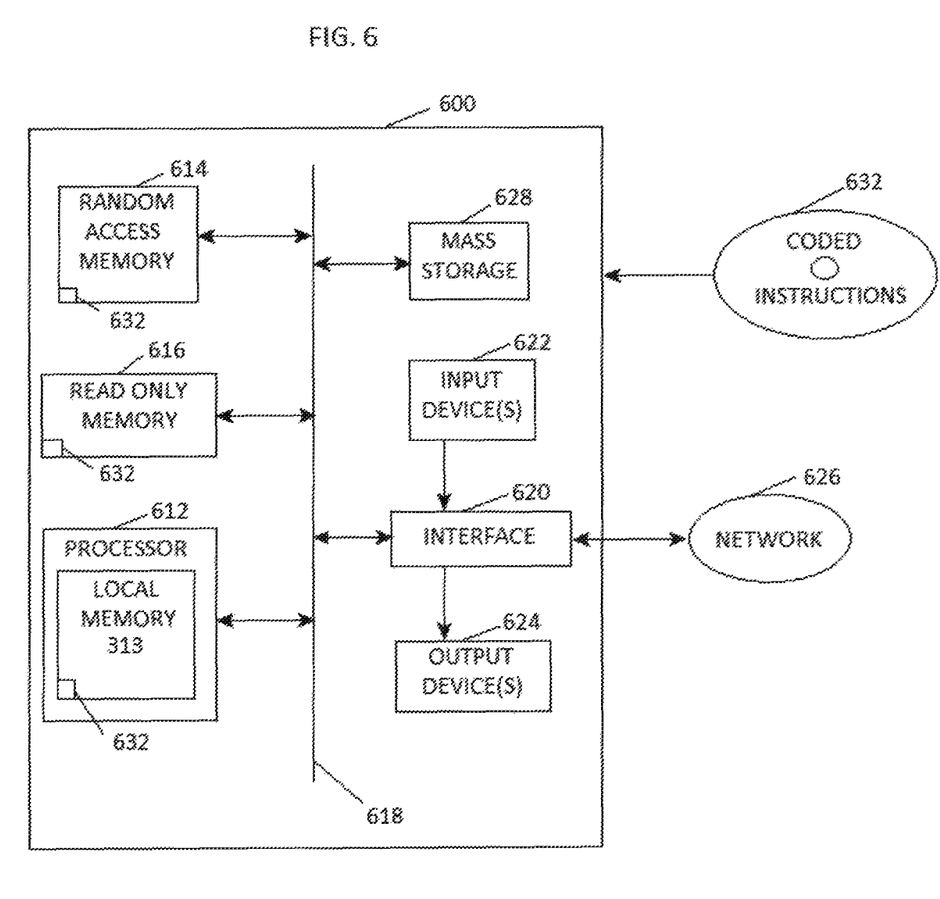
FIG. 6 is a block diagram of an example processing system capable of executing the example machine readable instructions of FIG. 3 to implement the example system for optical verification of sample authentication of FIG. 1.

FIG. 6 is a block diagram of a processor platform 600 capable of executing the instructions of FIG. 3 to implement the optical verification system of FIG. 1. The processor platform 600 can be, for example, a server, a personal computer, an Internet appliance, a DVD player, a CD player, a Blu-ray player, a gaming console, a personal video recorder, a smart phone, a tablet, a printer, or any other type of computing device.

The processor platform 600 of the instant example includes a processor 612. As used herein, the term "processor" refers to a logic circuit capable of executing machine readable instructions. For example, the processor 612 can be implemented by one or more microprocessors or controllers from any desired family or manufacturer.

The processor 612 includes a local memory 613 (e.g., a cache) and is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 also includes an interface circuit 620. The interface circuit 620 may be implemented by any type of interface standard, such as an Ethernet interface, a universal serial bus (USB), and/or a PCI express interface.

One or more input devices 622 are connected to the interface circuit 620. The input device(s) 622 permit a user to enter data and commands into the processor 612. The input device(s) can be implemented by, for example, a keyboard, a mouse, a touchscreen, a track-pad, a trackball, isopoint and/or a voice recognition system.

One or more output devices 624 are also connected to the interface circuit 620. The output devices 624 can be implemented, for example, by display devices (e.g., a liquid crystal display, a cathode ray tube display (CRT), a printer and/or speakers). The interface circuit 620, thus, typically includes a graphics driver card.

The interface circuit 620 also includes a communication device such as a modem or network interface card to facilitate exchange of data with external computers via a network 626 (e.g., an Ethernet connection, a digital subscriber line (DSL), a telephone line, coaxial cable, a cellular telephone system, etc.).

The processor platform 600 also includes one or more mass storage devices 628 for storing software and data. Examples of such mass storage devices 628 include floppy disk drives, hard drive disks, compact disk drives and digital versatile disk (DVD) drives.

The coded instructions 632 of FIG. 6 may be stored in the mass storage device 628, in the volatile memory 614, in the non-volatile memory 616, and/or on a removable storage medium such as a CD or DVD.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A system comprising:
a detection device to authenticate a sample and to return a positive authentication result if the sample is authentic and return a negative authentication result if the sample is not authentic, the detection device containing an optical emitter to emit a series of pulses of light in a first sequential pattern;
a smartphone in close proximity to and facing the detection device and the sample, the smartphone containing a camera to detect the first sequential pattern of light; and
a database to store data from the smartphone, wherein the optical emitter emits the first sequential pattern of light before the detection device authenticates the sample, the smartphone captures a first image of the detection device after the smartphone detects the first sequential pattern of light emitted by the optical emitter, and the smartphone transmits first data to the database after the detection device authenticates the sample.

2. The system of claim 1, wherein the detection device transmits the authentication result to the smartphone via a Bluetooth connection.

3. The system of claim 2, wherein the first data includes the authentication result, the first image, the time and date that the first image was captured and the GPS location of the smartphone when the first image was captured.

4. The system of claim 1, wherein the detection device transmits a first device ID associated with the particular detection device to the smartphone via a Bluetooth connection before the optical emitter emits the first sequential pattern of light and the smartphone receives the first device ID.

5. The system of claim 4, wherein the first sequential pattern of light is an encoded representation of the device ID.

6. The system of claim 5, wherein the smartphone decodes the detected first sequential pattern of light to determine a decoded device ID, the smartphone compares the received first device ID to the decode device ID and if this comparison reveals that the two device IDs are different, the operation of the detection device is halted.

7. The system of claim 4, wherein the first data includes the authentication result, the first image, the time and date that the first image was captured, the GPS location of the smartphone when the first image was captured, and the first device ID.

8. The apparatus of claim 1, wherein the sample contains inorganic ceramic particles with luminescent properties such that they emit light at a first wavelength when they are illuminated by light at a second wavelength.

9. The apparatus of claim 8, wherein the detection device authenticates the sample by illuminating the sample with light at the second wavelength, detecting a first strength of the luminescent response emitted by the sample at the first wavelength after the sample is illuminated by light at the second wavelength, and determining that the sample is authentic if the first strength is above a threshold and determining that the sample is not authentic if the first strength is not above the threshold.

10. A method comprising:
establishing a Bluetooth connection between a detection device and a smartphone;
emitting a series of pulses of light in a first sequential pattern from the detection device onto the face of the smartphone;
detecting the first sequential pattern of light impinging onto the face of the smartphone;
capturing a first image of the detection device with a camera on the smartphone after the first sequential pattern of light is detected;
storing the first image on the smartphone;
authenticating a sample with the detection device after the first sequential pattern of light is emitted to determine an authentication result;
transmitting the authentication result to the smartphone via the Bluetooth connection; and
transmitting a first set of data from the smartphone to a database.

11. The method of claim 10, wherein the first set of data includes the authentication result, the first image, the date and time when the first image was captured, and the GPS location of the smartphone at the time the first image was captured.

12. The method of claim 10, further comprising:
transmitting a first device ID corresponding to the detection device from the detection device to the smartphone via the Bluetooth connection before emitting the first sequential pattern of light.

13. The method of claim 12, wherein the first sequential pattern of light corresponds to an encoding of the first device ID, further comprising:
decoding the first sequential light pattern to determine a decoded device ID; and
comparing the decoded device ID to the first device ID received via the Bluetooth connection and halting the operation of the detection device if the two device IDs do not match.

14. The method of claim 12, wherein the first data includes the authentication result, the first image, the date and time when the first image was captured, the GPS location of the smartphone at the time the first image was captured, and the first device ID.

15. The method of claim 14, wherein determining whether the sample is authentic comprises:
determining that the sample is authentic if the first strength is greater than a threshold; and
determining that the sample is not authentic if the first strength is not greater than the threshold.

16. The method of claim 10, wherein the sample contains inorganic ceramic particles that have a luminescent response such that they emit light at a first wavelength when they are illuminated by light at a second wavelength, and authenticating the sample with the detection device comprises:
illuminating the sample with light at the second wavelength;
detecting the first strength of the luminescent response emitted by the sample at the first wavelength after the sample is illuminated with light at the second wavelength; and
determining whether the sample is authentic based on the first strength.

17. A non-transitory computer machine readable storage medium comprising instructions that, when executed, cause a machine to at least:
establish a Bluetooth connection between a detection device and a smartphone;
emit a series of pulses of light in a first sequential pattern from the detection device onto the face of the smartphone;
detect the first sequential pattern of light impinging onto the face of the smartphone;
capture a first image of the detection device with a camera on the smartphone after the first sequential pattern of light is detected;
store the first image on the smartphone;
authenticate a sample with the detection device after the first sequential pattern of light is emitted to determine an authentication result;
transmit the authentication result to the smartphone via the Bluetooth connection; and
transmit a first set of data from the smartphone to a database.

18. The non-transitory computer readable storage medium of claim 17, wherein the instructions further cause the machine to:
transmit a first device ID corresponding to the detection device from the detection device to the smartphone via the Bluetooth connection before emitting the first sequential pattern of light.

19. The non-transitory computer readable storage medium of claim 18, wherein the instructions further cause the machine to:
decode the first sequential light pattern to determine a decoded device ID; and
compare the decoded device ID to the first device ID received via the Bluetooth connection and halting the operation of the detection device if the two device IDs do not match and the first set of data includes the authentication result, the first image, the date and time when the first image was captured, the GPS location of the smartphone at the time the first image was captured, and the first device ID.

20. The non-transitory computer readable storage medium of claim 17, wherein the sample contains inorganic ceramic particles that have a luminescent response such that they emit light at a first wavelength when they are illuminated by light at a second wavelength, and the instructions cause the machine to authenticate the sample with the detection device by:
illuminating the sample with light at the second wavelength;
detecting the first strength of the luminescent response emitted by the sample at the first wavelength after the sample is illuminated with light at the second wavelength; and
determining whether the sample is authentic based on the first strength.

* * * * *